United States Patent
Yu

(10) Patent No.: US 7,063,571 B2
(45) Date of Patent: Jun. 20, 2006

(54) SMART CARD CONNECTOR

(75) Inventor: Hung Chi Yu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/917,933

(22) Filed: Aug. 13, 2004

(65) Prior Publication Data

US 2005/0037668 A1    Feb. 17, 2005

(30) Foreign Application Priority Data

Aug. 13, 2003    (TW) .............................. 92214631 U

(51) Int. Cl.
*H01R 24/00*    (2006.01)

(52) U.S. Cl. ...................... 439/630; 439/862
(58) Field of Classification Search ................ 439/630, 439/862
See application file for complete search history.

(56) References Cited

U.S. PATENT DOCUMENTS

| | | |
|---|---|---|
| 5,891,591 A | 4/1999 | Suzuki |
| 6,116,956 A * | 9/2000 | Wu ............................. 439/626 |
| 6,343,018 B1 * | 1/2002 | Takeyama et al. .......... 439/630 |
| 6,352,445 B1 | 3/2002 | Takei et al. |
| 6,409,529 B1 * | 6/2002 | Liu et al. .................... 439/188 |
| 6,454,607 B1 * | 9/2002 | Bricaud ....................... 439/630 |
| 6,685,512 B1 * | 2/2004 | Ooya .......................... 439/630 |
| 2001/0006855 A1 * | 7/2001 | Koitsalu ..................... 439/188 |
| 2002/0019179 A1 * | 2/2002 | Masumoto .................. 439/862 |
| 2003/0190843 A1 * | 10/2003 | Farnworth et al. .......... 439/630 |

* cited by examiner

*Primary Examiner*—Tho D. Ta
(74) *Attorney, Agent, or Firm*—Wei Te Chung

(57) ABSTRACT

An electrical connector (100) for a card (5) includes an insulative housing (1), a number of contacts (2) received in the housing and a shell (4) attached to the housing. The housing includes a bottom wall (11) having a number of passageways (111) and a number of support portions (113) extending from lower portion of the bottom wall and partially covering bottom surface of corresponding passageways. Each contact has a contact portion (22) having an upper convex portion upwardly projecting for contacting with the inserted card. Each of the contact portions comprises an abutting portion (24) having a lower convex surface downwardly projecting for abutting against the support portion. The contact portions and the abutting portions are opposite to each other in a top-to-bottom direction.

15 Claims, 5 Drawing Sheets

SMART CARD CONNECTOR

BACKGROUND OF THE INVENTION

1. Field of the Invention

The present invention relates to an electrical card connector and more particularly, to a smart card connector mounted on a printed circuit board (PCB).

2. Description of the Related Art

Electrical card connectors are usually mounted on a circuit board as a component of a contact device for receiving smart cards. The connector comprises a plurality of contacts for electrically connecting with gold fingers of an inserted smart card (chip card). U.S. Pat. No. 6,352,445 B2 issued to Takei on Mar. 5, 2002 discloses a card connector. The Takei card connector is provided for receiving memory cards and includes a connector body and a plurality of cantilevered terminals mounted in the connector body. Each terminal extends in a rear-to-front direction and includes rear-anchoring portion retained in the connector body and a cantilevered resilient arm extending forwardly from the anchoring portion. A contact portion projects upwardly from a front free end of the cantilevered resilient arm beyond an insulative body to connect a card. Being inserted into the connector body in a front-to-rear direction, a front end of a card downwardly deflects the contact portion, whereby gold fingers of the card electrically connect with the terminals.

However, because the rear-to-front extending directions of terminals are contrary to the front-to-rear insertion direction of the card, the front end of the inserted card tend to upwardly deflect the upwardly projecting contact portion, resulting damage of the terminals. Furthermore, the terminals of a current card connector are too tiny to have flexibility to come normal positions after a period of use, resulting in an unreliable connection with the inserted card.

Hence, an electrical connector with improved terminals is needed to overcome the foregoing shortcomings.

BRIEF SUMMARY OF THE INVENTION

It is an object of the present invention is to provide an electrical connector with improved contacts, which can securely contact with an inserted card.

An electrical connector is mounted on a printed circuit board (PCB, not shown) for receiving smart cards. The connector includes an insulative housing, a plurality of contacts received in the housing and a shell attached to the housing. The housing includes a bottom wall having a plurality of passageways defined therein and a plurality of support portions extending from lower portion of the bottom wall and partially covering bottom surface of corresponding passageways. The contact has a contact portion having an upper convex surface projecting upwardly for contacting with the inserted card. Each of the contact portion comprises an abutting portion extends from a front end of the contact portion and cooperates with the contact portion to form a substantially hook-shaped configuration. The abutting portion has a lower convex surface projecting downwardly therefrom for abutting against the support portion of the housing. The contact portion and the abutting portion are opposite to each other in a top-to-bottom direction.

Because each contact of the electrical connector employs the downwardly projecting abutting portion, a front end of the inserted card impossibly deflect upwardly the front end of the contact portion, thereby avoiding damage the contact portion of each contact of the electrical connector. Furthermore, the abutting portions provide the contact portions with enough flexibility, ensuring the contact portion robustly come to normal positions.

Other objects, advantages and novel features of the invention will become more apparent from the following detailed description when taken in conjunction with the accompanying drawings.

DESCRIPTION OF THE PREFERRED ENBODIMENTS

Figure 1:
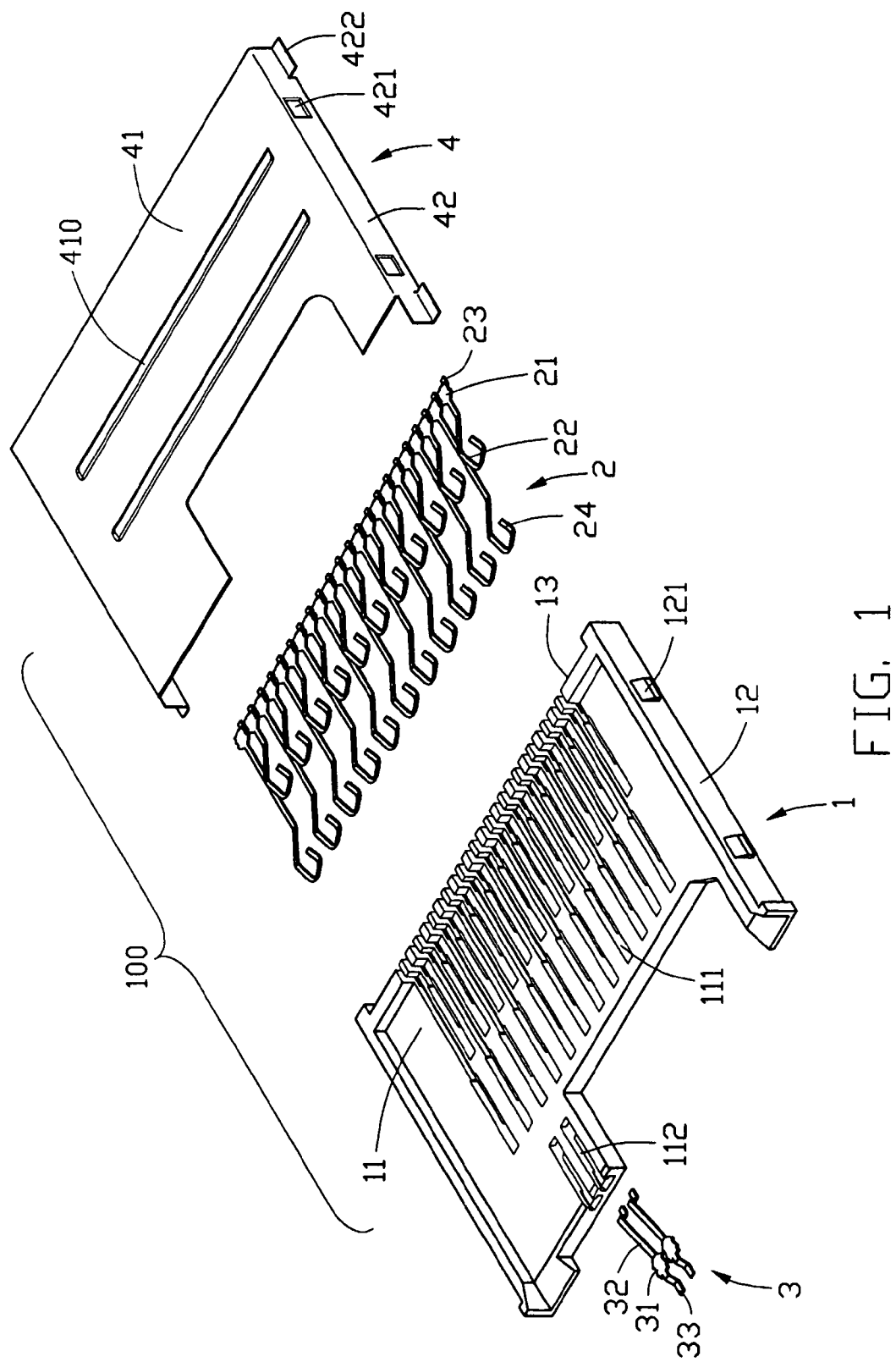
FIG. 1 is an exploded view of an electrical card connector according to the present invention.
Figure 2:
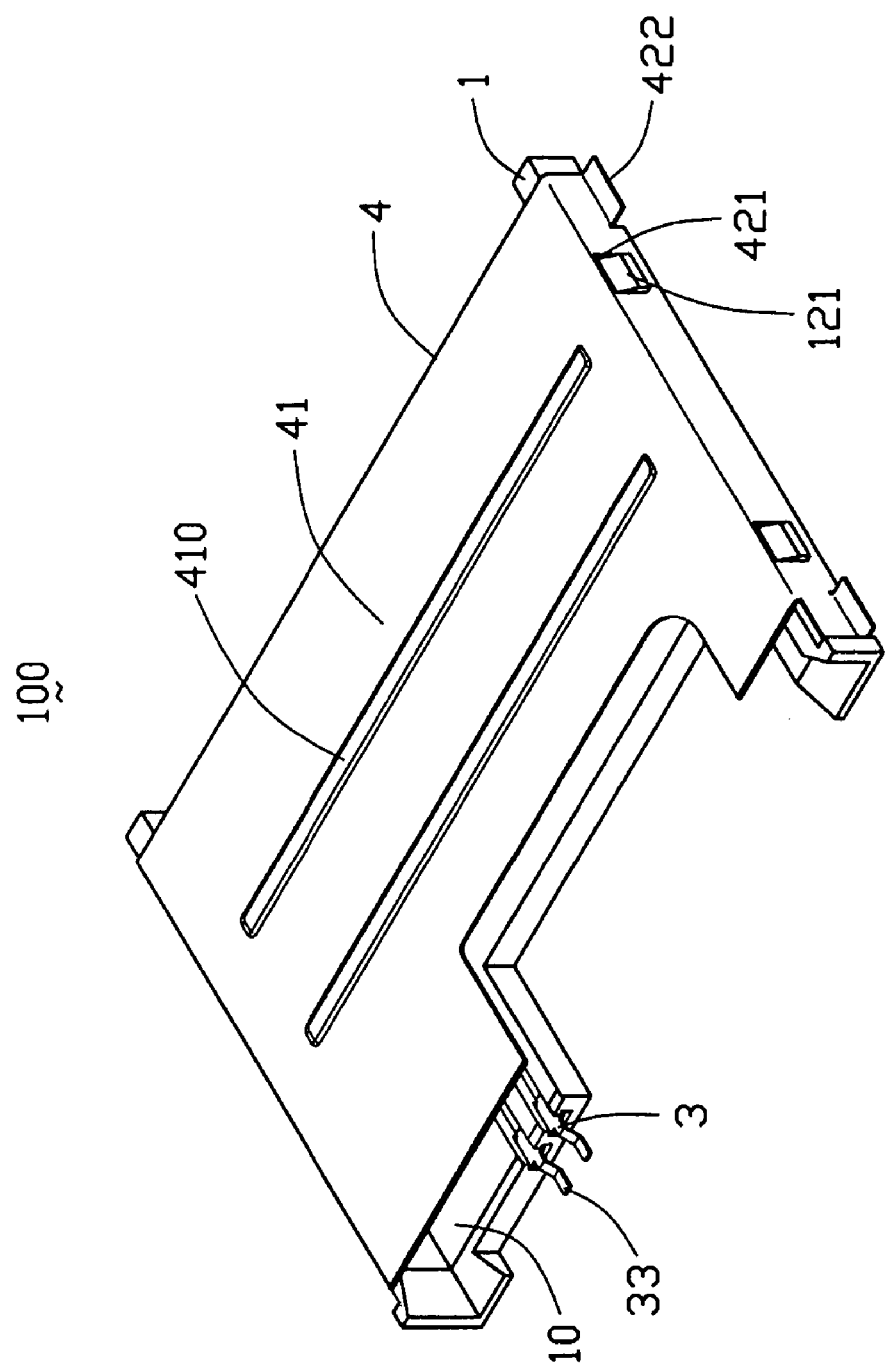
FIG. 2 is an assembled view of FIG. 1.
Figure 4:
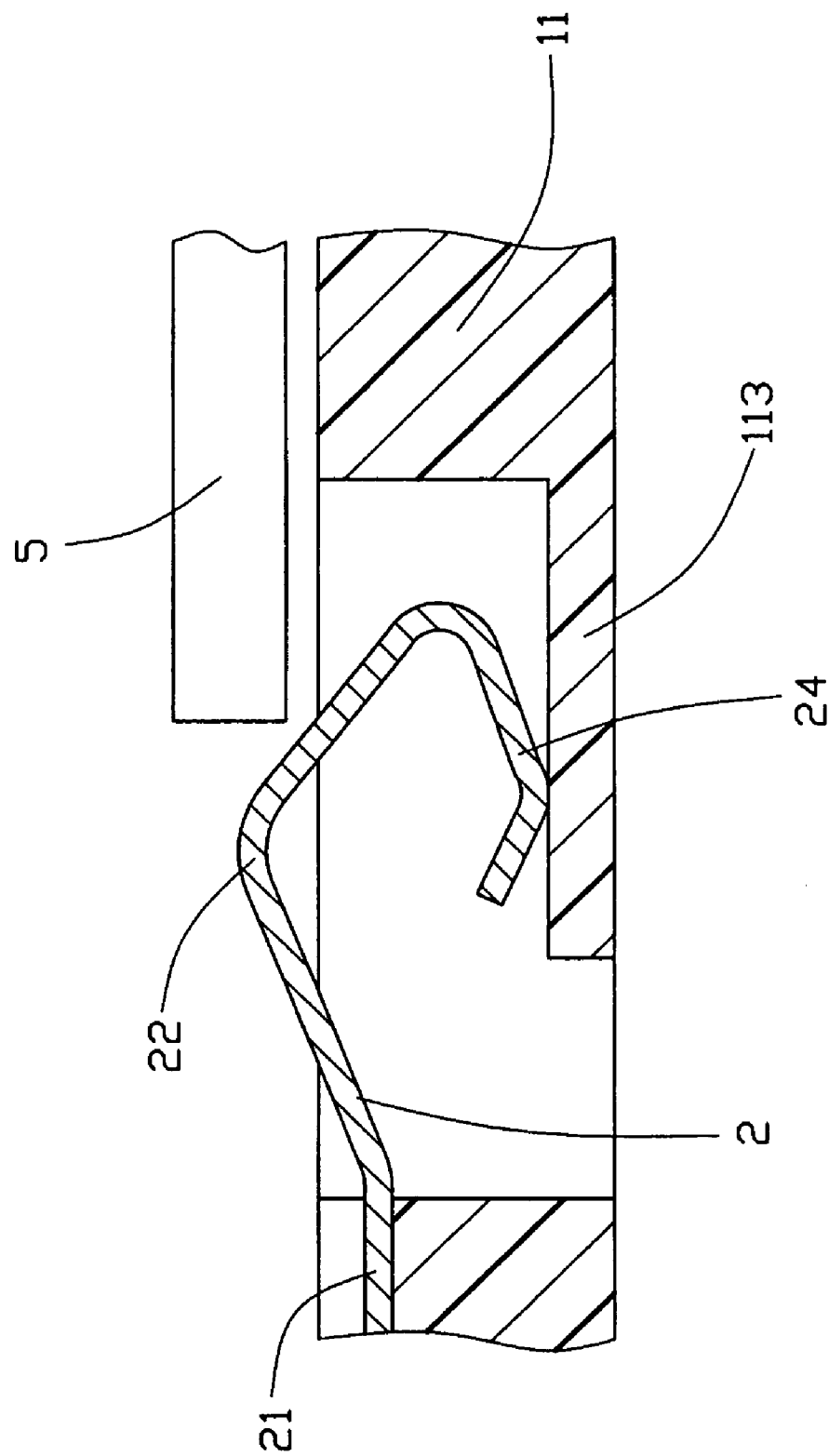
FIG. 4 is a cross-sectional view of FIG. 3 taken along line of 4—4 of FIG. 3 before the card is fully inserted into the electrical card connector.

Referring to FIGS. 1, 2 and 4, an electrical connector 100 of the present invention mounted on a printed circuit board (PCB, not shown) includes an insulative housing 1, a plurality of conductive contacts 2, a pair of switch terminals 3 received in the housing 1, and a shell 4 substantially attached to the housing 1 to define a card-receiving space 10 for receiving a card 5.

The housing 1 includes a botton rear and two side walls 11, 13 and 12. The bottom wall 11 has a plurality of passageways 111 parallelly spaces apart one another for receiving the contacts 2 therein and a pair of slots 112 for receiving the terminals 3. A plurality of support portions 113 extend from lower portion of the bottom wall 11 and partially cover bottom surfaces of corresponding passageways 111 for supporting corresponding contacts 2. Each passageway 111 defines an opening at a portion not covered by the support portions 113 and through the housing 1 in a vertical direction. The housing 1 further has a plurality of embossments 121 projecting outwardly from the two side walls 12 for securing the shell 4 to the housing 1, as will be discussed later.

Each contact 2 as best shown in FIG. 1, includes a base portion 21, an elastic contacting portion 22 extending upwardly and forwardly from an end of the base portion 21, a soldering portion 23 downwardly and rearwardly from opposite end of the base portion 21 and an abutting portion 24 extending from the contacting portion 22. The contact portion 22 has an upper convex surface (not labeled) projecting upwardly for contacting with the inserted card 5. The abutting portion 24 extends from a front end of the contact portion 22 and cooperates with the contact portion 22 to form a substantially hook-shaped configuration. The abutting portion 24 comprises a lower convex surface (not labeled) projecting downwardly therefrom for abutting against the support portion 113 of the housing 1. The contact portion 22 and the abutting portion 24 are opposite to each other in a top-to-bottom direction.

The terminals 3 as shown in FIG. 1 are received in the slots 112 of the housing 1. Each terminal 3 includes a base section 31, an elastic contact section 32 extends upwardly and rearwardly from a rear end of the base section 31 and a soldering section 33 downwardly and forwardly from opposite end of the base section 31.

The shell 4 includes a top plate 41 and two side plates 42 extending downwardly from opposite sides of the top plate 41. The top plate 41 has a plurality of depressions 410 for biasing against the inserted card 5. Each side plate 42 includes a plurality of holes 421 receiving the embossments 121 of the housing 1, and a plurality of flanges 422 extending transversely therefrom for soldering to the PCB.

Referring to FIGS. 1 and 2, in assembly, the contacts 2 are installed in corresponding passageways 111 with the contact portions 22 projecting above the passageways 111 and with the lower convex surfaces of the abutting portions 24 abutting against the support portions 113. The soldering portions 23 of the contacts 2 extend beyond the rear wall 13 of the housing 1. The terminals 3 are received in corresponding slots 112 of the bottom wall 11 respectively with the contact sections 32 upwardly projecting above the slots 112. The soldering sections 33 of the terminals 3 extend beyond the rear wall 13 of the housing 1. The shell 4 is attached to the housing 1. The embossments 121 of the side walls 12 of the housing 1 are held in the corresponding holes 421 of the side plates 42 of the shell 4. Finally, the electrical connector 100 is mounted on the PCB. The soldering portions 23 of the contacts 2 and the soldering sections 33 of the terminals 3 are soldered to the PCB respectively. The flanges 422 of the side plates 42 of the shell 4 are also soldered to the PCB.

Figure 3:
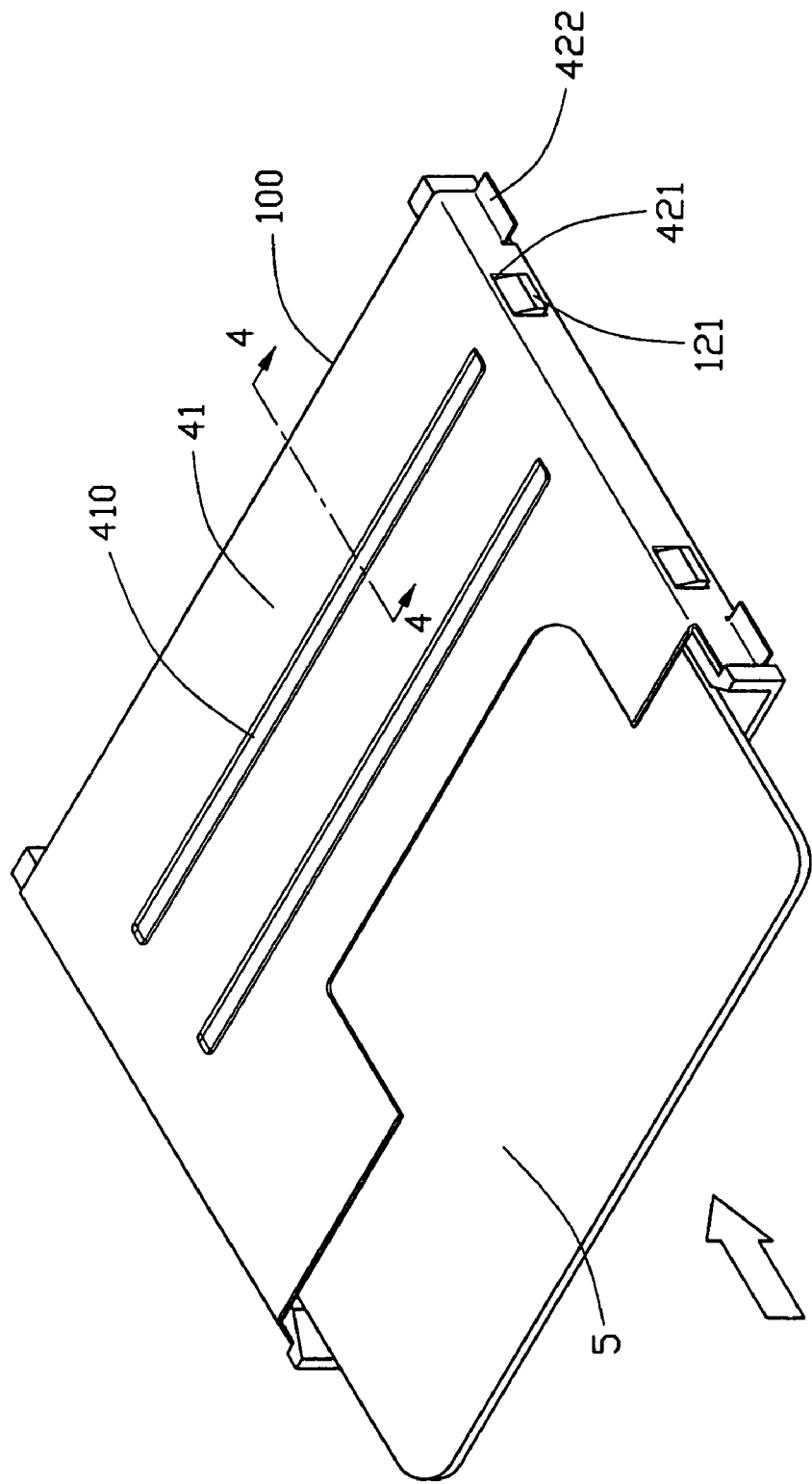
FIG. 3 is a view similar to FIG. 2 wherein a card is inserted into the electrical card connector.
Figure 5:
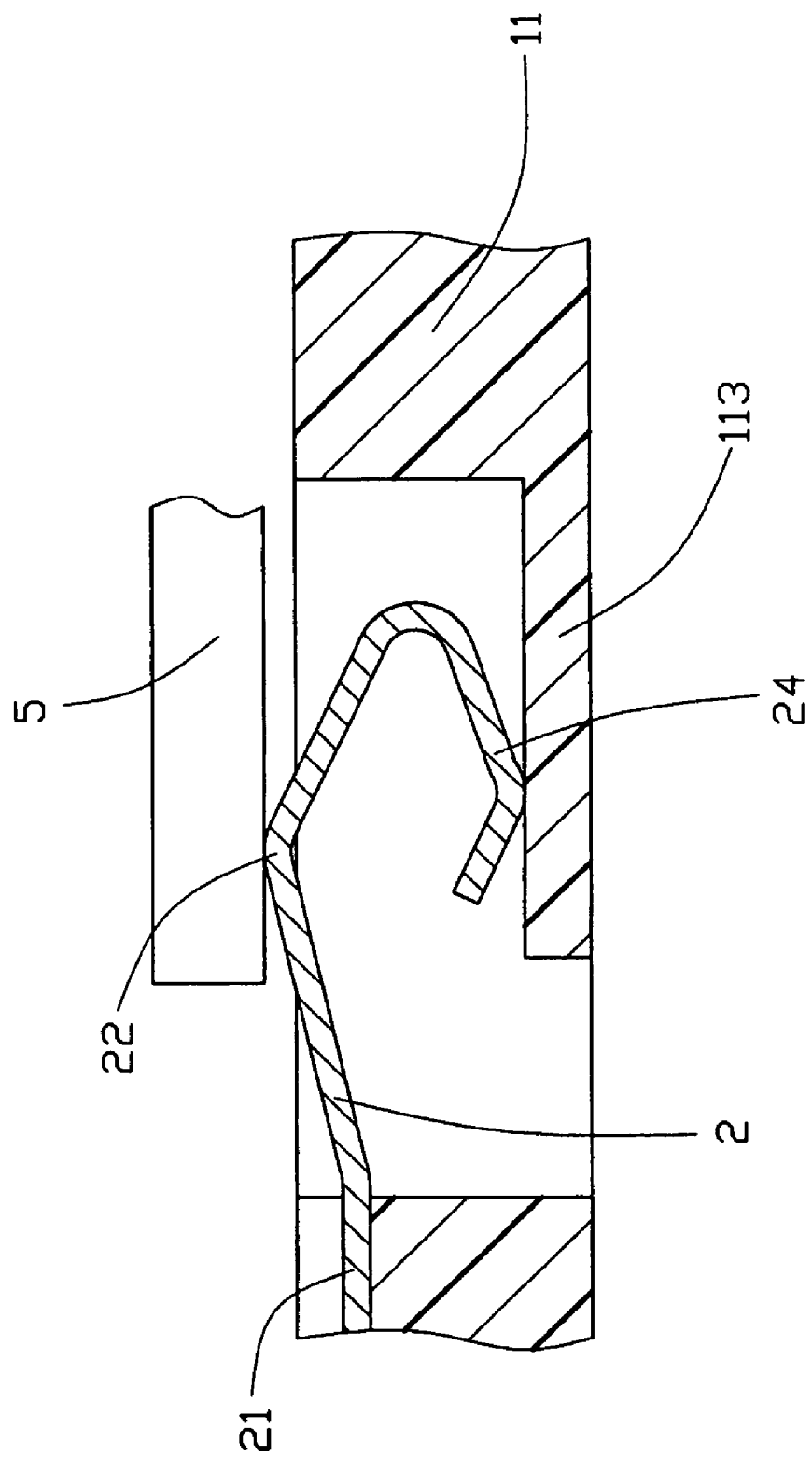
FIG. 5 is a view similar to FIG. 4, wherein the card is fully inserted into the electrical card connector.

Referring to FIGS. 3 to 5, in using, the card 5 is inserted into the card-receiving space 10 of the housing 1 along an upper surface of the bottom wall 11 of the housing 1. The contact portions 22 of the contacts 2 are deflected downwardly by the inserted card 5 and electrically connect with gold fingers of the card 5. The abutting portions 24 of contacts 2 are abut against the support portion 113 of the bottom wall 11 to deposit enough resilient strength for reversion of the contacts 2. Therefore, securely connection between the contacts 2 and the inserted card 5 is obtained. When the card 5 is extracted out of the card-receiving space 10, the contact portions 22 and the abutting portions 24 are released and elastically return to former condition.

It is to be understood, however, that even though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector mounted on a printed circuit board, comprising:
    an insulative housing having a-bottom wall defining a plurality of passageways; and
    a plurality of contacts received in corresponding passageways and each having a contact portion upwardly projecting beyond the insulative housing and an abutting portion extending downwardly from the contact portion for abutting against the bottom wall;
    wherein the contact portion and the abutting portion are substantially opposite to each other in a top-to-bottom direction, the abutting portion having a downwardly projecting convex surface.

2. The electrical connector according to claim 1, wherein the insulative housing forms a plurality of support portions, each support portion covering at least one portion of a corresponding passageway and each abutting portion of the contacts projecting downwardly for abutting against a corresponding support portion.

3. The electrical connector according to claim 1, wherein the abutting portion of each contact projects downwardly through a corresponding passageway to abut against at least one portion of a corresponding support portion.

4. The electrical connector according to claim 1, wherein the contact portion and the abutting portion cooperatively form a substantially hook-shaped configuration and the contact portion has a upwardly projecting convex surface for contacting with an inserted card.

5. An electrical connecter mounted on a print circuit board, comprising:
    an insulative housing having a bottom wall;
    a plurality of contacts received in the housing and each having a contact portion upwardly projecting beyond the insulative housing and an abutting portion downwardly extending from a distal end of the contact portion to abut against at least one portion of the bottom wall; and
    a shell attached to the housing defining a space of receiving a card;
    wherein the bottom wall defines a plurality of passageways, each abutting portion of the contact being received in a corresponding passageway;
    wherein the abutting portion of each contact projects downwardly through a corresponding passageway for abutting against at least one portion of a corresponding support portion.

6. The electrical connector as claimed in claim 5 wherein the insulative housing forms a plurality of support portions, each support portion covering at least one portion of a corresponding passageway and each abutting portion of the contact projecting downwardly for abutting against the at least one portion of a corresponding passageway.

7. The electrical connector as claimed in claim 5 wherein the contact portion and the abutting portion cooperatively form a substantially hook-shaped configuration and the contact portion has a upwardly projecting convex surface for contacting with an inserted card.

8. The electrical connector as claimed in claim 7 wherein the contact portion and the abutting portion are substantially opposite to each other in a top-to-bottom direction, the abutting portion having a downwardly projecting convex surface.

9. An electrical connector for use with an electronic card, comprising:
    an insulative housing defining a plurality of passageways along a longitudinal direction;
    a plurality of contacts disposed in the corresponding passageways, respectively;
    a plurality of openings extending through the housing in a vertical direction and communicating with the corresponding passageways, respectively;
    first and second planes defined in each of the passageways and by two sides of the corresponding opening; and
    each of said contacts defining a first section downwardly seated upon the first plane and second section downwardly seated upon the second plane; wherein
    said passageways are open to an exterior in said vertical direction opposite to the corresponding openings, respectively; wherein
    said terminal is deflected in said vertical direction when used with the card.

10. The electrical connector as claimed in claim 9 wherein said first and second planes are located at different level.

11. The electrical connector as claimed in claim 9, wherein a metallic shell is located above the housing in said lateral direction so as to define a cavity for receiving electronic card therein.

12. The electrical connector as claimed in claim 9 wherein said second section is located at a distal end of the contact.

13. The electrical connector as claimed in claim 12, wherein said contact is of a bellow type.

14. The electrical connector as claimed in claim 9 wherein the second plane is lower than the first plane, and the second section is located at a distal end of the contact.

15. The electrical connector as claimed in claim 14 wherein a contacting point for use with the electronic card is located above the housing and between the first section and the second section.

* * * * *